April 16, 1963    A. M. KENNEDY    3,085,261
RETRACTIBLE WHEELS FOR BOATS
Filed Oct. 31, 1960
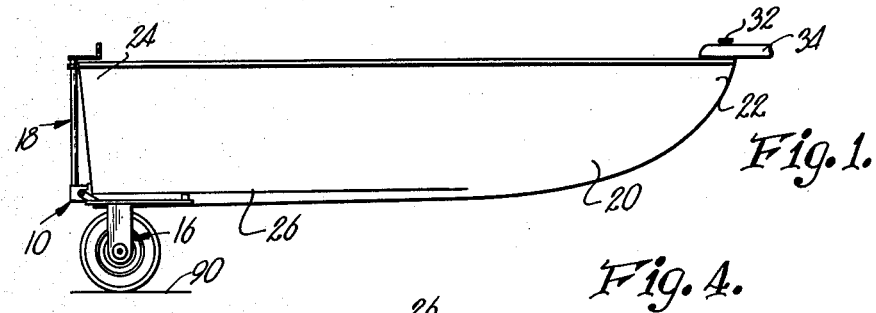
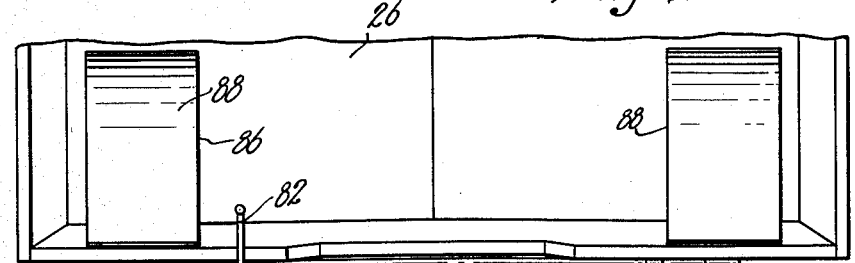
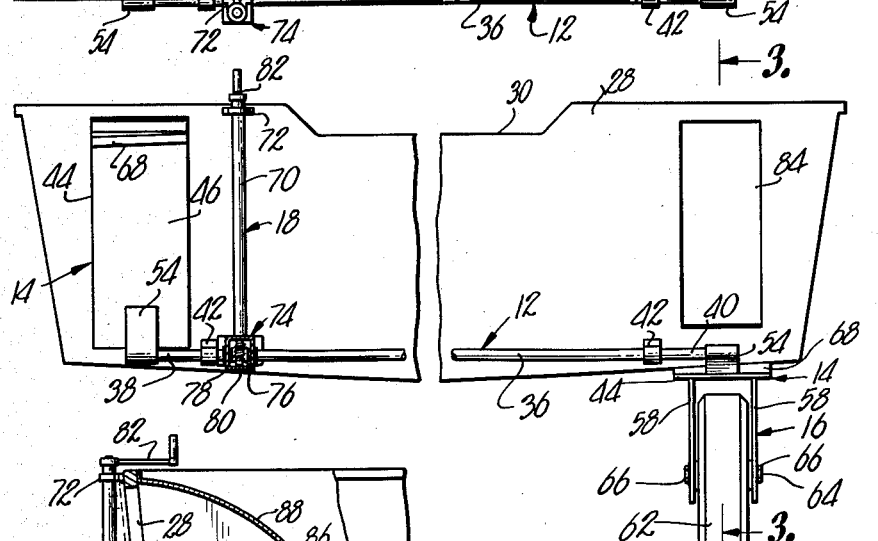
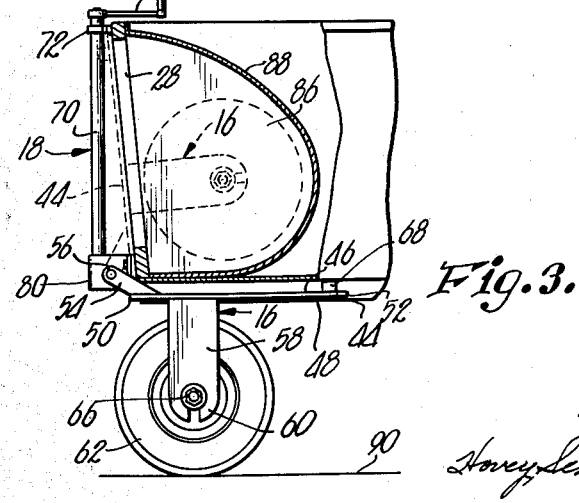
INVENTOR.
Arthur M. Kennedy
BY
ATTORNEYS 3,085,261
RETRACTIBLE WHEELS FOR BOATS
Arthur M. Kennedy, 1103 E. Vivion Road,
Kansas City 18, Mo.
Filed Oct. 31, 1960, Ser. No. 65,986
5 Claims. (Cl. 9—1)

This invention relates to wheeled attachments for vehicles and, more particularly, to a wheeled attachment carried by a boat for rendering the same mobile over a surface such as a roadway.

In towing boats of the type utilized with outboard motors to a launching site from a point remote therefrom, a conventional towing trailer has heretofore been used, which trailer carries the boat to be towed and is operably coupled to a towing vehicle. Upon arriving at the site, it is the customary practice to reverse the towing vehicle or to unhitch the trailer and manually move the latter rearwardly to convey or transport the boat to the edge of the water of the launching site, whereupon the boat is shifted rearwardly of the trailer and into the water.

Although such a means for transporting a boat is satisfactory, it has been found that considerable effort is oftentimes expended in removing the boat from the trailer, or in placing the boat thereon, due mainly to the size and weight of the boat. Further, if the boat is carried on a trailer of the aforementioned character, the trailer must be moved to the edge of the water or partially thereinto, for removal of the boat from the trailer. This, of course, necessitates that the launching site be in shallow water so that, if the wheels of the trailer extend into the water, the trailer will be effectively supported while the boat is being removed therefrom.

The present invention circumvents these difficulties by precluding the necessity of removing or emplacing a boat on a trailer for transporting the boat, and by precluding the necessity of launching the boat in shallow water. To accomplish these results, the instant invention provides a retractible, wheeled attachment for a boat of the type described, which attachment is secured to the boat and swingable from a first position supporting the bottom of said boat to a second position clearing said bottom.

It is, therefore, the primary object of this invention to provide a means secured to a boat for imparting mobility thereto so that the boat may be transported over a roadway or the like, and thereby the necessity of a conventional trailer for transporting the boat is precluded.

Another important object of the present invention is the provision of a retractible, wheeled attachment which may be secured to a boat, and movable into a first position whereby mobility is imparted to the boat for movement thereof over a roadway, and movable into a second position substantially out of the water surrounding the boat when the latter has been launched, whereby to effectively eliminate the drag force on the boat due to the wheels of the attachment projecting into the water.

Still another important object of the present invention is the provision of means secured to a boat for imparting mobility thereto and to permit the boat to be launched in deep water, as well as shallow water.

Yet another important object of the present invention is the provision of a retractible, wheeled attachment for a boat for imparting mobility thereto, to permit the same to be transported over a roadway, which attachment is provided with manually operated power means for retracting the wheels of the attachment, whereby the user of the boat, sitting therewithin, may retract the wheels substantially out of the water after the boat has been launched.

Other important objects of this invention relate to the provision of an elongated shaft interconnecting a pair of wheel and axle assemblies, whereby the assemblies are shifted into and out of boat-supporting relationship with a roadway when said shaft is rotated; to the provision of a flat plate secured to the assemblies whereby the boat rests on the plates and is supported thereby when said assemblies are moved into the position supporting said boat; to the provision of a pair of laterally spaced collars rotatably receiving said shaft and secured to a boat, whereby said shaft is rotatable relative to the boat; and to the provision of gear means on the shaft and a rod transverse thereto, said rod being accessible to the user of the boat, whereby the wheels of the attachment may be retracted substantially out of the water by the user of the boat after the same has been launched.

Other objects of this invention will become apparent as the following specification progresses, reference being had to the accompanying drawing, wherein:

FIGURE 1 is a side elevational view of a conventional boat adapted for use with an outboard motor, and the wheeled attachment, which is the subject of the present invention, secured to the rear extremity of the boat;

FIG. 2 is an enlarged, fragmentary, end elevational view of the instant invention illustrating the wheeled attachment in the retracted and boat supporting positions;

FIG. 3 is a fragmentary, cross-sectional, side elevational view taken along line 3—3 of FIG. 2; and FIG. 4 is a fragmentary, plan view of the rear extremity of the boat of FIG. 2.

The retractible, wheeled attachment which is the subject of this invention, is broadly denoted by the numeral 10 and comprises elongated structure 12 interconnecting a pair of spaced supports 14, each of said supports 14 being provided with a wheel and axle assembly 16, and power operated means 18 operably coupled with elongated structure 12 for rotating the latter.

Attachment 10, in the preferred form illustrated in FIGS. 1 to 4, is shown attached to a boat 20 having a front extremity 22, a rear extremity 24, a bottom 26, and a rear wall 28 extending uprightly from bottom 26 at extremity 24 thereof. Rear wall 28 is provided with a recess 30 therein along the upper marginal edge thereof for securing thereto a conventional outboard motor in the usual manner. Boat 20 is provided with hitch means 32 adapted to be coupled to an elongated hitching shaft 34 adapted to be connected in any suitable manner to a towing vehicle, such as an automobile, a truck or the like.

Elongated structure 12 comprises an elongated shaft 36 having a pair of opposed ends 38 and 40 respectively, it being noted that the shaft 36 is horizontally disposed and, by virtue of a pair of horizontally spaced collars 42 secured to end wall 28 proximal to the lower marginal edge of the latter, shaft 36 is disposed on boat 20 at the rear extremity 24 thereof and substantially transverse to the longitudinal axis of boat 20. Although bottom 26 of boat 20 slopes slightly downwardly as the center of the boat 20 is approached, it is clear that ends 38 and 40 of shaft 36 are disposed slightly above the lower marginal edge of end wall 28 proximal to ends 38 and 40. It is clear that collars 42 permit shaft 36 to be rotated relative to end wall 28 of boat 20, and shaft 36, as is clear in FIG. 3, is spaced outwardly from end wall 28 so as to insure that shaft 36 does not contact the latter at any time.

Supports 14 each comprises an elongated flat plate 44 having a pair of opposed faces 46 and 48 respectively, and a pair of opposed ends 50 and 52 respectively. Plate 44 is secured to the proximal end of shaft 36 by means of an elongated crank 54 secured at one end thereof to the end 50 of plate 44 and at the other end to the proximal end of shaft 36, it being clear that the other end of crank 54 is provided with an opening 56 therethrough for receiving the proximal end of shaft 36. Means are also provided for rigidly securing crank 54 to the proximal end of shaft 36 so that plate 44 is rotatable with shaft 36. Secured to face 48 of plate 44 and extending outwardly therefrom, is a pair of spaced legs 58 having slotted outer ends 60 and receiving therebetween a wheel 62 rotatably mounted on a shaft 64 held within the slots of end 60 by fastening means 66 in the form of a threaded nut. Legs 58 are disposed on plate 44 intermediate the ends 50 and 52 thereof so as to distribute the weight of a vehicle, such as boat 20, over the length of plate 44. A transverse bearing block 68 is secured to the face 46 of plate 44 for a purpose hereinafter described.

Power means 18 comprises an elongated rod 70 rotatably mounted on rear wall 28 by means of a bracket 72 surrounding rod 70 proximal to the upper extremity thereof, and gear means 74 on shaft 36 and rod 70, for rotating shaft 36 upon the rotation of rod 70. Gear means 74 includes a first worm gear 76 on the lower extremity of rod 70, and a second worm gear 78 carried by shaft 36 and rotatable therewith, it being clear that first and second gears 76 and 78 are in substantial mesh and enclosed within a gear box 80 which is substantially water-tight to thereby preclude the introduction of water thereinto. A handle 82 is removably secured to the upper extremity of rod 70 for rotating the same about the longitudinal axis thereof to thereby rotate shaft 36 about the longitudinal axis of the latter.

Boat 20 is provided with a pair of spaced wheel wells 84 in the rear wall 28 thereof for receiving wheel and axle assemblies 16 when shaft 36 is rotated to retract the assemblies 16 out of boat supporting relationship with a surface disposed below boat 20. Wheel wells 84 are formed from a pair of side walls 86 having an arcuate, peripheral edge and an end wall 88 conforming to the peripheral edge of side walls 86 in the manner shown in FIG. 3. The enclosure formed by walls 86 and 88 is of a size sufficient to house wheel 62 and legs 58 when the face 48 of plate 44 engages the outer surface of rear wall 28, as shown by the dash-dot line position of the assembly 16 of FIG. 3.

In operation, the boat 20 is supported by attachment 10 in the manner shown in FIGS. 1 and 3 with the wheels 62 engaging a surface 90, such as a roadway or the like. In this position, plate 44 is in underlying relationship to the bottom 26 of boat 20 with block 68 secured to plate 44 in engagement with the underside or bottom 26 of boat 20. In this boat-supporting relationship to surface 90, crank 54 is inclined inwardly and downwardly relative to end wall 28 of boat 20, and the longitudinal axes of legs 58 are substantially aligned along an axis parallel to the longitudinal axis of rod 70. It is conceivable that locking means may be provided for attachment 10 to prevent the rotation of shaft 36 when plate 44 and wheel 62 is disposed in boat-supporting relationship to surface 90. In this position, boat 20 may be transported over surface 90 by means of the towing vehicle secured to the front extremity 22 of boat 20.

Upon reaching the launching site of boat 20, the boat may be unhitched from the towing vehicle and manually conveyed to the edge of the water, or the towing vehicle may be reversed to reverse the movement of boat 20 toward the launching site at the edge of the water. At the launching site, the boat may be immediately launched without removing attachment 10, and it is clear that boat 20 need not be launched in shallow water for the attachment 10 need not be removed prior to launching of the boat 20. After the boat has been launched, the handle 82 is rotated to rotate rod 70 and thereby, shaft 36. Upon rotation of shaft 36, plate 44, and thereby wheels 60 secured thereto, are rotated about the longitudinal axis of shaft 36 until the wheels 62 at each end of shaft 36, are disposed within wheel wells 84 in end wall 28, in the manner shown in the dash-line positions of FIG. 3. Plate 44 associated with each wheel 62 therefor, covers the opening of the corresponding wheel well 84 and it is conceivable that sealing means may be utilized to prevent the introduction of water into wheel wells 84 after the openings thereof have been closed by plates 44. In the retracted positions, wheels 62 are substantially out of the water so that any drag force caused by wheels 62 projecting into the water, is wholly eliminated.

When it is desired to remove the boat from the water, the front extremity 22 is pulled out of the water and hitched once again to the towing vehicle which pulls boat 20 out of the water after the plates 44 and the associated wheels 62, have been moved to the boat-supporting position once again, to the position shown in FIG. 3 of the drawing. The towing vehicle is then capable of removing the boat 20 from the water and immediately, the wheels 62 once again contact surface 90 for movement away from the water.

By virtue of the instant disclosure, the necessity for using a conventional boat trailer is eliminated, and the boat 20 need not be removed from, or emplaced on such a trailer, thereby reducing the amount of time and effort required to launch boat 20 into the water or remove the same from the water. Further, after the boat 20 has been launched into the water, the wheels 62 may be easily and effectively retracted by the user of the boat sitting therewithin and prior to the removing of boat 20 from the water, the wheels may once again be moved into boat-supporting relationship upon the rotation of rod 70 by the user of the boat.

Having thus described the invention, what is claimed as new and desired to be secured by Letters Patent is:

1. In a wheeled attachment for a boat having a bottom and a rear wall secured to said bottom, an elongated shaft; means operably coupled with said shaft and adapted to be secured to said rear wall for mounting said shaft on the latter for rotation about the longitudinal axis of said shaft; a support plate having a pair of opposed faces and secured to each end of said shaft respectively for rotation therewith; a wheel and axle assembly secured to each support plate respectively and extending outwardly from one face thereof; and actuatable means operably coupled with the shaft and adapted to be secured to said rear wall for rotating the shaft and thereby said support plates in opposed directions and for alternately moving the assemblies successively downwardly and forwardly into and successively rearwardly and upwardly out of a position underlying the bottom of the boat in supporting relationship thereto with the opposite faces of the support plates engaging said boat when the assemblies are in said positions.

2. In a mobile boat having a bottom and a rear wall secured to said bottom, the combination with said boat of a support having means thereon engageable with said bottom; a wheel and axle assembly secured to said support; and means secured to said support and rotatably mounted on said rear wall for moving said support and said assembly forwardly into and rearwardly out of a position with said bottom engaging means underlying and engaging said bottom in supporting relationship to said boat.

3. In a mobile boat having a bottom and a rear wall secured to said bottom, the combination with said boat of an elongated shaft rotatably mounted on said rear wall adjacent the lower extremity of the latter; a support plate for each end of said shaft respectively and secured thereto for rotation therewith; a wheel and axle assembly for each support plate and secured thereto for movement therewith; and actuatable means carried by said rear wall and operably coupled to said shaft for rotating the latter to swing said support plates downwardly and forwardly into a first position with said assemblies underlying the bottom of the boat in supporting relationship thereto, said support plates being movable rearwardly and upwardly into a second position spaced above the first position to move said assemblies out of said relationship.

4. In a mobile boat as set forth in claim 3, wherein said support plates are each provided with means disposed for engaging said boat when the corresponding plate is in said first positions, and wherein is included wheel well means on said rear wall for receiving said assemblies therein when the plates are moved into said second positions.

5. In a mobile boat as set forth in claim 4, wherein said wheel well means extends forwardly of said rear wall, each support plate having a face engageable with said rear wall in closing relationship to corresponding wheel well means when the corresponding assembly is in said second position.

References Cited in the file of this patent

UNITED STATES PATENTS

| | | |
|---|---|---|
| 2,539,693 | McClintock | Jan. 30, 1951 |
| 2,740,135 | Church | Apr. 3, 1956 |
| 2,890,466 | Bly | June 16, 1959 |
| 2,893,019 | Renfroe et al. | July 7, 1959 |
| 2,916,747 | Parrott | Dec. 15, 1959 |